(12) United States Patent
Mazawa et al.

(10) Patent No.: US 8,160,022 B2
(45) Date of Patent: Apr. 17, 2012

(54) WIRELESS COMMUNICATION SYSTEM, WIRELESS BASE STATION, WIRELESS TERMINAL AND COMMUNICATION CONTROL METHOD OF THE WIRELESS COMMUNICATION SYSTEM

(75) Inventors: Shiro Mazawa, Fujisawa (JP);
Toshiyuki Saito, Kyotanabe (JP);
Keisuke Takeuchi, Kunitachi (JP);
Rintaro Katayama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 986 days.

(21) Appl. No.: 12/109,442

(22) Filed: Apr. 25, 2008

(65) Prior Publication Data
US 2009/0005060 A1 Jan. 1, 2009

(30) Foreign Application Priority Data

Apr. 27, 2007 (JP) ................ JP-2007-117951
Apr. 21, 2008 (JP) ................ JP-2008-109737

(51) Int. Cl.
*H04W 4/00* (2009.01)
(52) U.S. Cl. ........................ 370/331; 455/436
(58) Field of Classification Search .................. None
See application file for complete search history.

(56) References Cited

U.S. PATENT DOCUMENTS

| | | | |
|---|---|---|---|
| 7,630,391 B2 * | 12/2009 | Jin et al. | 370/431 |
| 2004/0160919 A1 * | 8/2004 | Balachandran et al. | 370/335 |
| 2004/0179493 A1 * | 9/2004 | Khan | 370/332 |
| 2007/0155388 A1 * | 7/2007 | Petrovic et al. | 455/442 |
| 2007/0254658 A1 * | 11/2007 | Fabien et al. | 455/436 |
| 2010/0040014 A1 * | 2/2010 | Kang et al. | 370/329 |

* cited by examiner

*Primary Examiner* — Anh-Vu Ly
(74) *Attorney, Agent, or Firm* — Antonelli, Terry, Stout & Kraus, LLP.

(57) ABSTRACT

A wireless access terminal, after handoff, adds channel quality information calculated in the wireless access terminal to a header of transmit data and transmits this data until a wireless base station succeeds in receiving at least one or more packets. The wireless base station, when having succeeded in receiving a packet for the first time after the handoff, extracts the channel quality information from a received header to initialize channel quality information inside the wireless base station. Subsequently, the wireless base station autonomously updates the channel quality information in response to success or failure of packet reception and controls the transmission rate.

3 Claims, 8 Drawing Sheets

FIG.5A — UPDATE PACKET ERROR RATE

FIG.5B — INITIALIZE PACKET ERROR RATE

WIRELESS COMMUNICATION SYSTEM, WIRELESS BASE STATION, WIRELESS TERMINAL AND COMMUNICATION CONTROL METHOD OF THE WIRELESS COMMUNICATION SYSTEM

INCORPORATION BY REFERENCE

The present application claims priority from Japanese applications JP-2007-117951 filed on Apr. 27, 2007 and JP-2008-109737 filed on Apr. 21, 2008 the contents of which are hereby incorporated by reference into this application.

BACKGROUND OF THE INVENTION

The present invention relates to communication control techniques in a wireless communication system. In particular, the present invention relates to a mobile wireless communication system using a distributed network, in which information concerning an access terminal is taken over between base station controllers, and to a communication control technique for movement between a plurality of mobile wireless communication systems.

In recent years, the use of the Internet has increased and the environment in which the Internet can be used has also been expanding. Especially, the ability to access the Internet using a mobile wireless communication equipment, such as a mobile phone, allows you to use the Internet wherever you are in the country.

As the use of the Internet increases and the environment in which the Internet can be used expands, services provided on the Internet have also been expanding. This results in technology needs and technical problems concerning the Internet access. For example, with regard to the services, for example, a higher speed in communication channels to adapt to the delivery of large-capacity applications, such as music/video, is required, and short delay/low jitter and the like are required as the problem to adapt to voice interactive communications. Also in the mobile wireless communication system, in order to satisfy these various needs, studies for high speed and wide band have been rapidly going on.

In the mobile wireless communication, since there is a limit in the available frequency resources, how to achieve high frequency-usage efficiency and high transmission speed within a limited frequency bandwidth is an essential key in achieving the system. Moreover, since a wireless access terminal moves and the radio environment always changes, it is necessary to control in response to an environmental change. If a control in response to an environmental change is not performed, a stable channel quality cannot be secured. As an index of the channel quality, a packet error rate obtained by averaging the percentage of success or failure in receiving packets that are transmitted and received within a wireless communication system is mainly used.

In order to satisfy the above-described conditions required for the wireless communication system, in a wireless communication system optimized to packets, a method of rapidly switching the transmission rate in response to the radio environment is employed. As such a method of rapidly switching the transmission rate in response to the radio environment, for example, in the case of an IxEV-DO scheme shown in 3gpp2, C. S0024B ver. 1.0, Cdma2000 High Rate Packet Data Air Interface Specification, a wireless access terminal itself determines the transmission rate based on the radio environment and the channel quality condition, and periodically reports this to a wireless base station, and communicates with this transmission rate, thereby achieving a high-speed switching.

SUMMARY OF THE INVENTION

In a mobile wireless communication system employing an antenna technique, such as MIMO and transmission diversity, in communicating between a wireless access terminal and a wireless base station, the antenna technique used between the wireless access terminal and the wireless base station needs to be selected suitably. For this reason, as a method of implementing the scheme of rapidly switching the transmission rate in response to the radio environment, a scheme such as the one in the case of the IxEV-DO scheme, in which a wireless access terminal itself determines the transmission rate based on the radio environment and channel quality condition and periodically reports this result to a wireless base station, as described in the background of the invention, cannot achieve this object. Accordingly, a different scheme is currently used. In the mobile wireless communication system employing an antenna technique, such as MIMO and transmission diversity, the transmission rate is not determined by a wireless access terminal, but the condition of the radio environment is periodically reported from the wireless access terminal to the wireless base station. Then, such scheme is used that in the wireless base station, on the basis of the condition of the radio environment received from the wireless access terminal and the channel quality condition calculated in the wireless base station, the transmission rates for both the uplink and the downlink are suitably determined along with an antenna technique used in the wireless base station. In the wireless base station, information, including the condition of the radio environment sent from the wireless access terminal, is associated with the wireless access terminal and is managed in the wireless base station.

Thus, in the case of a scheme in which a wireless base station determines the transmission rate, in order for the wireless base station to determine an appropriate transmission rate for both the uplink and downlink, the wireless base station side should always know the channel quality condition correctly.

Incidentally, in the mobile wireless communication system, along with the movement of a wireless access terminal, a wireless base station currently communicating with the wireless access terminal needs to be switched during communication. This is called handoff. As described above, in the case of the system employing an antenna technique, a wireless base station needs to know the channel quality condition of a wireless access terminal correctly at all times. However, if the handoff occurred and a destination base station of a wireless access terminal has switched over, then, in the above-described system which will not take over the current channel quality condition between base stations, the current channel quality condition being known by the wireless base station side that has been connected to, the destination wireless base station cannot determine the channel quality accurately unless it transmits and receives a certain amount of packets or more from the wireless access terminal which has been handed off thereto. For this reason, the reception quality of the wireless access terminal will not be stabilized for a while after the handoff. If a too high transmission rate has been allocated until the receiving condition becomes stable, a packet error will occur frequently. On the other hand, if a too low transmission rate has been allocated, the throughput will decrease unduly.

On the other hand, in the case of a mobile wireless communication system using a distributed network, in which information concerning a wireless access terminal is taken over between base station controllers, the current channel quality condition may be taken over between base stations at the time of handoff. However, in this case, such problem will occur that the service will stop for an amount of time required to take over between base stations. Moreover, while the establishment of such mechanism that takes over the current channel quality information between base stations may have an advantage in strengthening their cooperation between base stations, it also has a problem that the system control becomes complicated.

Moreover, the same problem will occur also when a wireless access terminal connectable to a plurality of mobile wireless communication systems hands off between a plurality of mobile wireless communication systems.

The present invention has been made to solve the above-described problems. It is an object of the present invention to provide a communication control technique in a wireless communication system that can provide a wireless access terminal with a stable channel quality and high throughput even when handoff is repeated within the same mobile communication system or between a plurality of mobile communication systems.

In order to solve the above-described problems, in the present invention, in transmitting the first packet after handoff, a wireless access terminal transmits the packet including the previous channel quality information to a wireless base station, and the wireless base station sets this channel quality information as the initial value of the channel quality information, and will keep updating the subsequent channel quality information, and control so as to determine the transmission rate based on this information.

According to the present invention, a stable channel quality and a high throughput can be provided to a wireless access terminal even when handoff is repeated within a mobile communication system or between a plurality of mobile communication systems.

Other objects and features and advantages of the invention will become apparent from the following description of the embodiments of the invention taken in conjunction with accompanying drawings.

DETAILED DESCRIPTION OF THE INVENTION

Hereinafter, embodiments of the present invention will be described with reference to examples.

In the following embodiments, description is made on the basis of C.S0084-0 which is under study as a next generation system for achieving higher speed and wider bandwidth.

C.S0084-0 is a system which is under discussion for standardization as a system two steps ahead of the current 1xEV-DO. In C.S0084-0, both uplink/downlink are based on orthogonal frequency division multiplex access (hereinafter, referred to as OFDMA) allowing for communication at 70 Mbps for the uplink and 280 Mbps for the downlink.

Here, first, a rate control method in the downlink, a rate control method in the uplink, and handoff information in C.S0084-0, which are required to describe the embodiments of the present invention, are described.

First, the rate control method in the downlink is described.

In a downlink, a wireless access terminal periodically measures the reception quality of the downlink, and notifies the measurement result to a wireless base station by using an R-CQICH (Reverse Channel Quality Indicator Channel). The wireless base station determines the transmission rate and frequency bandwidth to allocate, based on the reception quality information notified from the wireless access terminal, packet error rate information calculated thereinside, and the amount of data buffered in the wireless base station, and notifies this result to the wireless access terminal by transmitting information called an FLAB (Forward Link Assignment Block) with the use of an F-SCCH (Forward Shared Control Channel). Moreover, the R-CQICH also has a function to allow a wireless access terminal to designate a wireless base station, which the wireless access terminal desires to communicate with in the downlink. When a change occurs in a wireless base station designated in the R-CQICH, handoff of the downlink is carried out.

Next, the rate control method in an uplink is described.

In an uplink, a wireless access terminal notifies a wireless base station with the amount of data, which the wireless access terminal desires to transmit in the uplink, with the use of an R-REQCH (Reverse Request Channel). The wireless base station determines the transmission rate and frequency bandwidth to allocate, based on the measured reception quality information, packet error rate information calculated thereinside, and the notified amount of data, and notifies the wireless access terminal by transmitting information called an RLAB (Reverse Link Assignment Block) with the use of the F-SCCH. Moreover, the R-REQCH also has a function to allow a wireless access terminal to designate a wireless base station, which the wireless access terminal desires to communicate with in an uplink. When a change occurs in a wireless base station designated in the R-REQCH, handoff of an uplink is carried out. The handoff of an uplink and downlink can be carried out completely independently.

In C.S0084-0, as described above, a means for achieving a high-speed rate control and handoff in an uplink and downlink by means of the dedicated channels is provided. However, a means for taking over packet error rate information at the time of handoff is not provided. For this reason, when handoff is repeated at high speed, it takes time to obtain a correct packet error rate, and the channel quality will not be stabilized for a while after the handoff. Accordingly, such problem will occur that packet errors occur frequently or the throughput drops unduly.

Then, in the following embodiments, such wireless-communication control technique that can, on the basis of the technique under study in C.S0084-0, flexibly correspond to a comprehensive range of services provided in future and fully utilize the broad-banded resources will be described specifically using examples.

Embodiment 1

First, an overall configuration of a network including a wireless communication system to which the present invention is applied is described.

Figure 1:
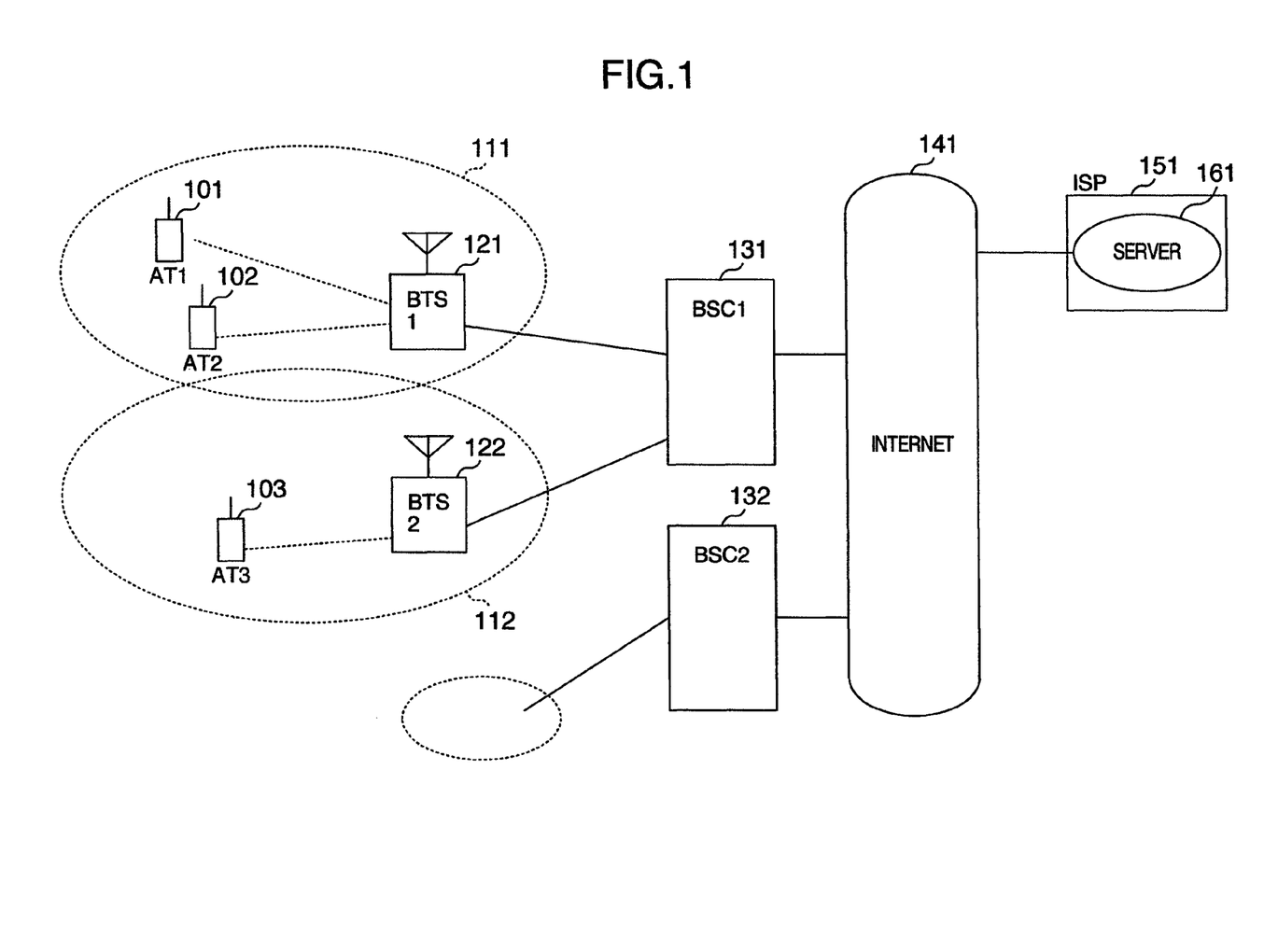
FIG. 1 is a diagram illustrating an overall configuration of a communication network including a wireless communication system and the Internet, to which the present invention is applied.

FIG. 1 is a diagram illustrating an overall configuration of the communication network including a wireless communication system, to which the present invention is applied, and the Internet, and a wired communication system.

As shown in FIG. 1, in the network to which the present invention is applied, the wireless communication system is connected to the Internet. In such a network, for example, a wireless access terminal (AT) 101 of the wireless communication system communicates via a wireless base station transceiver subsystem (BTS) 121 in a receiving area 111, and accesses a server 161 in an internet service provider (ISP) 151 on the Internet 141 via a base station controller (BSC) 131.

Figure 2:
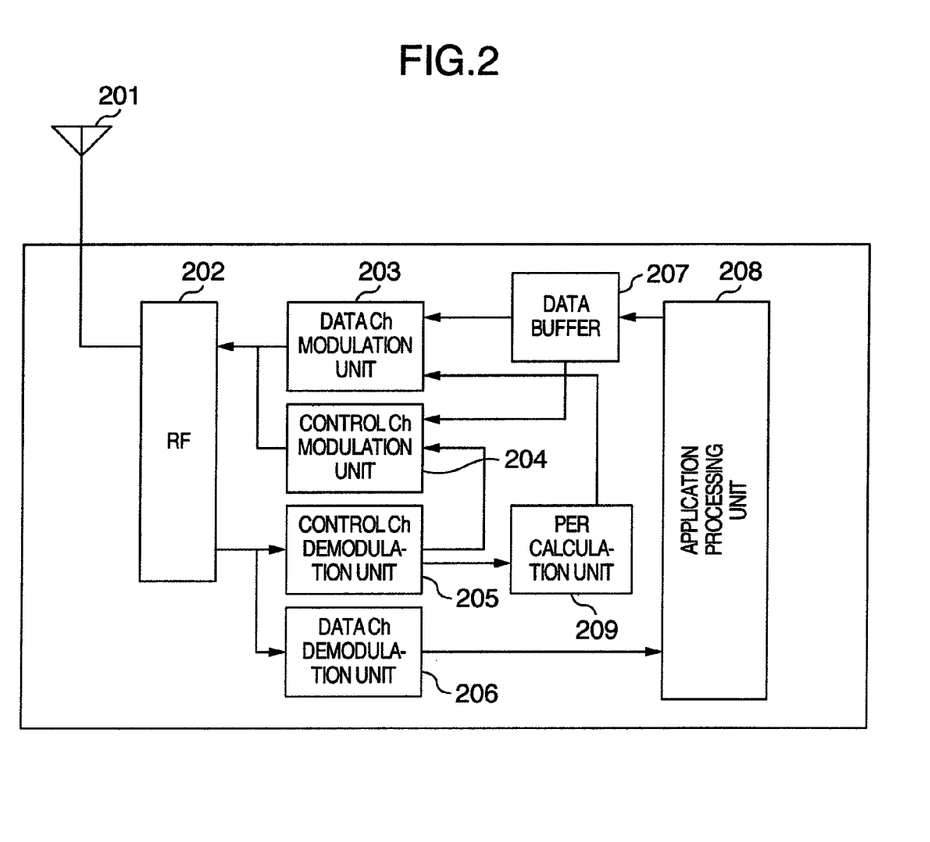
FIG. 2 is a diagram illustrating a configuration of a wireless access terminal in an embodiment of the present invention.

FIG. 2 is a diagram illustrating a configuration of a wireless access terminal in the embodiment of the present invention.

As shown in FIG. 2, the wireless access terminal comprises: an antenna 201 which transmits and receives a radio wave between a wireless base station to convert this into a high frequency signal; an RF unit 202 which modulates and demodulates the high frequency signal to convert into a baseband signal having a low frequency; a data Ch modulation unit 203 which modulates transmit data to convert into a baseband signal; a control Ch modulation unit 204 which modulates control information to convert into a baseband signal; a control Ch demodulation unit 205 which demodulates a received signal to extract control information; a data Ch receiving unit 206 which demodulates and decodes a received signal to extract received data; a data buffer 207 which temporarily buffers transmit data; and an application processing unit 208 which processes the application. The wireless access terminal further comprises a packet error rate measuring unit (PER measuring unit) 209, which updates the packet error rate based on information indicative of "ready or not ready for reception" that comes from a wireless base station in response to a packet transmitted to the wireless base station. The wireless access terminal, when having performed handoff, includes packet error rate information calculated by the PER of the wireless access terminal into a header of a transmission packet destined to a wireless base station and transmits this packet to the wireless base station to be handed off. After the handoff, the wireless access terminal includes the packet error rate information into a header of a transmission packet and transmits this packet until it receives information indicative of "ready for packet reception" from the wireless base station to be handed off.

At this point, an amount of data stored in the data buffer 207 is notified to the control Ch modulation unit 204 by the application processing unit, which is then notified to the wireless base station using the R-REQCH. Moreover, the control Ch demodulation unit 205 measures the strengths of signals, which a plurality of wireless base stations are transmitting, and then, based on this result, selects a wireless base station to communicate with and measures the reception quality condition in the selected wireless base station. These results are notified to the control Ch modulation unit 204, which are then notified to the wireless base station using R-CQICH. The notification to the wireless base station is continued until the wireless base station succeeds in receiving at least one packet.

Figure 3:
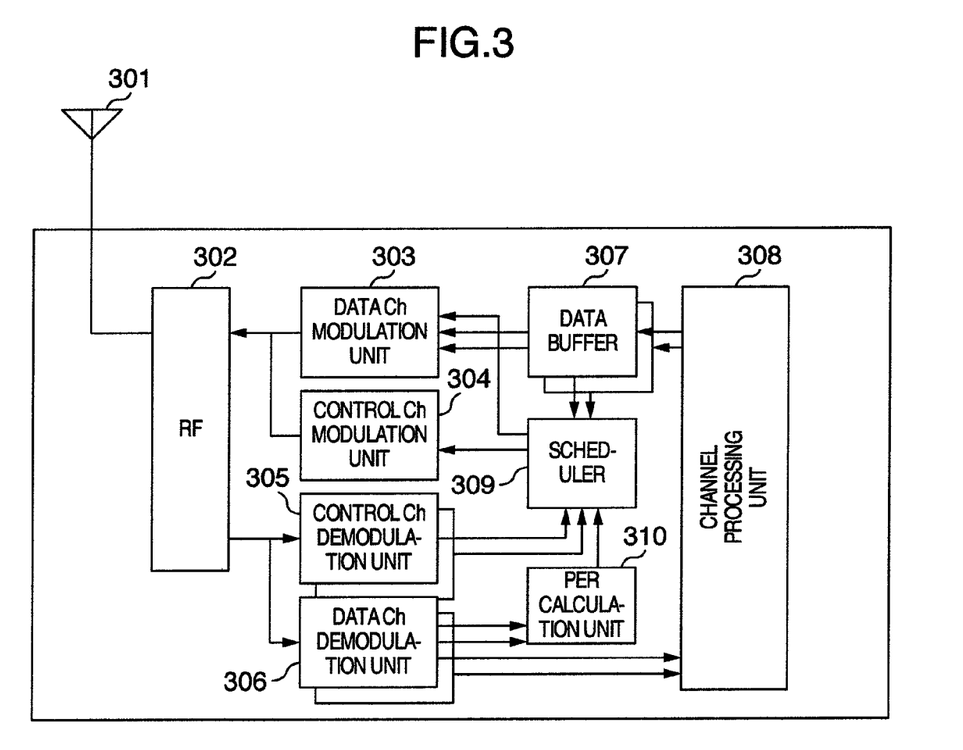
FIG. 3 is a diagram illustrating a configuration of a wireless base station in the embodiment of the present invention.

FIG. 3 is a diagram illustrating a configuration of a base station in the embodiment of the present invention.

As shown in FIG. 3, the wireless base station comprises: an antenna 301 which transmits and receives a radio wave between a wireless access terminal in an area to convert this into a high frequency signal; an RF unit 302 which modulates and demodulates the high frequency signal to convert into a baseband signal having a low frequency; a data Ch modulation unit 303 which modulates transmit data to convert into a baseband signal; a control Ch modulation unit 304 which modulates control information to convert into a baseband signal; a control Ch demodulation unit 305 which demodulates received signal to extract control information; a data Ch receiving unit 306 which demodulates and decodes a received signal to extract received data; a data buffer 307 which temporarily buffers transmit data; a channel processing unit 308 for transmitting data to a base station controller; a scheduler 309 which determines a transmission rate from information of a received control Ch and the like; and a PER measuring unit 310 which calculates a packet error rate from a data demodulation result in the data Ch demodulation unit. Here, as many control Ch demodulation units 305 and data buffers 307 as the number corresponding to all the wireless access terminals in an area are prepared in advance, and as many data Ch modulation units 304 and data Ch demodulation units 306 as the number corresponding to the number of wireless access terminals which the scheduler 309 has allocated are prepared in advance. The scheduler 309 determine a transmission rate and bandwidth allocated to a wireless access terminal on the basis of a downlink buffer amount notified from the data buffer 307, an uplink buffer amount obtained as a result of reception at the Ch demodulation unit, downlink/uplink signal quality, and packet error rate information notified from the PER measuring unit 310.

Figure 4A:
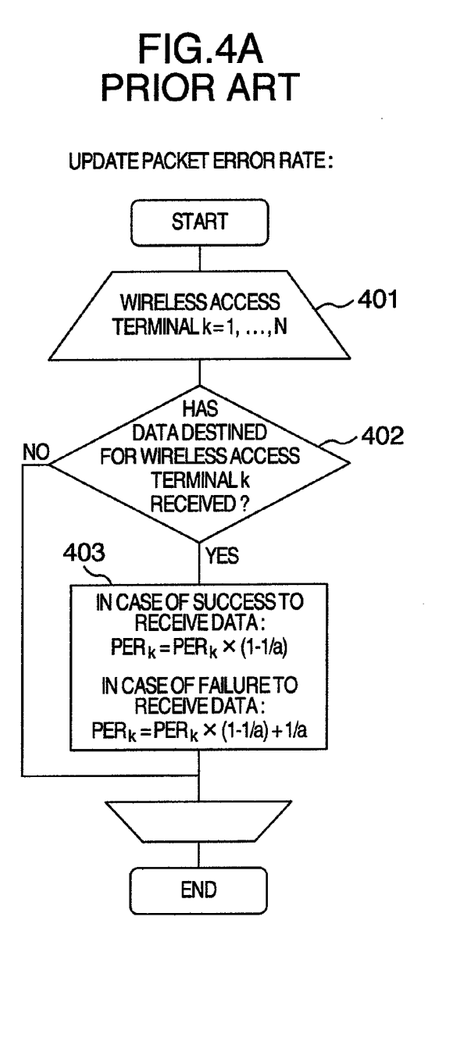
FIGS. 4A and 4B are views explaining conventional packet error rate calculation algorithms.
Figure 4B:
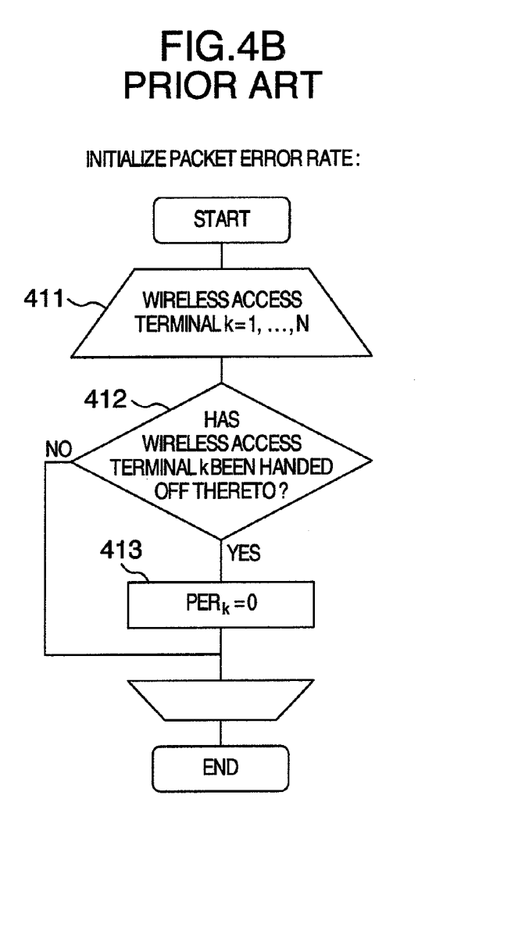

FIGS. 4A and 4B show conventional packet error rate calculation algorithms in the PER measuring unit. Upon receipt of a packet, a wireless base station determines which wireless access terminal the packet corresponds to (401, 402). Then, the wireless base station updates the average of packet error rates of the corresponding access terminal by using an IIR filter with a time constant "a" (403). Moreover, if the wireless access terminal has been handed off thereto from other wireless base station, the wireless base station initializes the packet error rate to 0 (411, 412, 413).

Figures 5A, 5B:
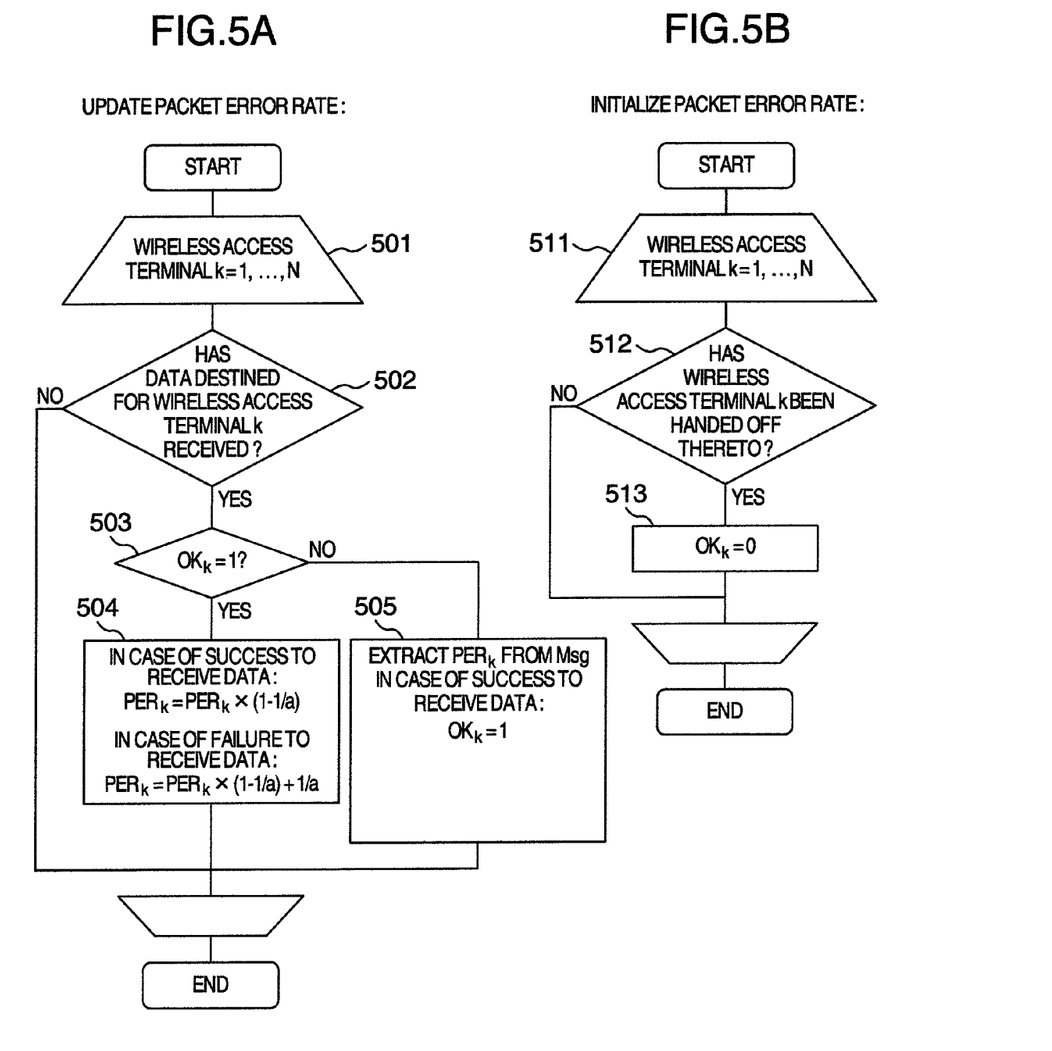
FIGS. 5A and 5B are views explaining packet error rate calculation algorithms in the embodiment of the present invention.

FIGS. 5A and 5B show packet error rate calculation algorithms in the present embodiment.

Upon receipt of a packet, a wireless base station determines which wireless access terminal the packet corresponds to (501, 502). Then, the wireless base station determines, with respect to this access terminal, whether or not the wireless base station has succeeded in receiving a packet even once after the handoff (503). If having succeeded in receiving a packet in the past, the wireless base station updates the packet error rate based on information indicative of "ready or not ready for packet reception" that is received using the same algorithm as that of the conventional example (504).

If having succeeded in receiving a packet for the first time from a new wireless access terminal which has been handed off thereto, since the packet error rate information calculated in the PER of the wireless access terminal is included in the header of a received packet, the wireless base station extracts this information. Then, conventionally, with respect to a wireless access terminal which has been handed off thereto, the wireless base station sets the packet error rate information to 0 and then optimizes this while transmitting and receiving packets. However, in this embodiment, instead of setting the packet error rate information to 0, the wireless base station uses, as the initial value, the value of packet error rate information sent from the wireless access terminal, the packet error rate information being included in the header of the packet of the wireless access terminal which has been handed off thereto. Then, the wireless base station turns off a packet reception success flag (505). Moreover, if the wireless access terminal has been handed off thereto from other wireless base station, the wireless base station turns off the packet reception success flag for initialization (511, 512, 513).

Figure 6:
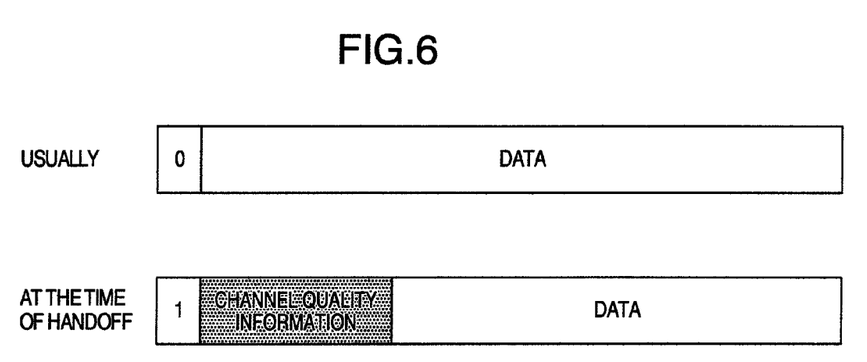
FIG. 6 is a view illustrating a packet format in the embodiment of the present invention.

FIG. 6 shows packet formats of this embodiment.

The leading 1 bit indicates whether or not the packet error rate information is stored. If the leading 1 bit is 0, the packet error rate information is not stored and data is stored except in the leading 1 bit. If the leading 1 bit is 1, the packet error rate information is stored and the data is stored following the packet error rate information. After handoff, the wireless access terminal sets 1 to the leading 1 bit and transmits this packet including the packet error rate information until it receives information indicative of "ready for packet reception" from a wireless base station to be handed off.

Embodiment 2

As other example, as Embodiment 2, a method of using a sum of power control bits as the channel quality information in a system, in which a wireless base station controls the transmission power of a wireless access terminal, is described.

Figure 7:
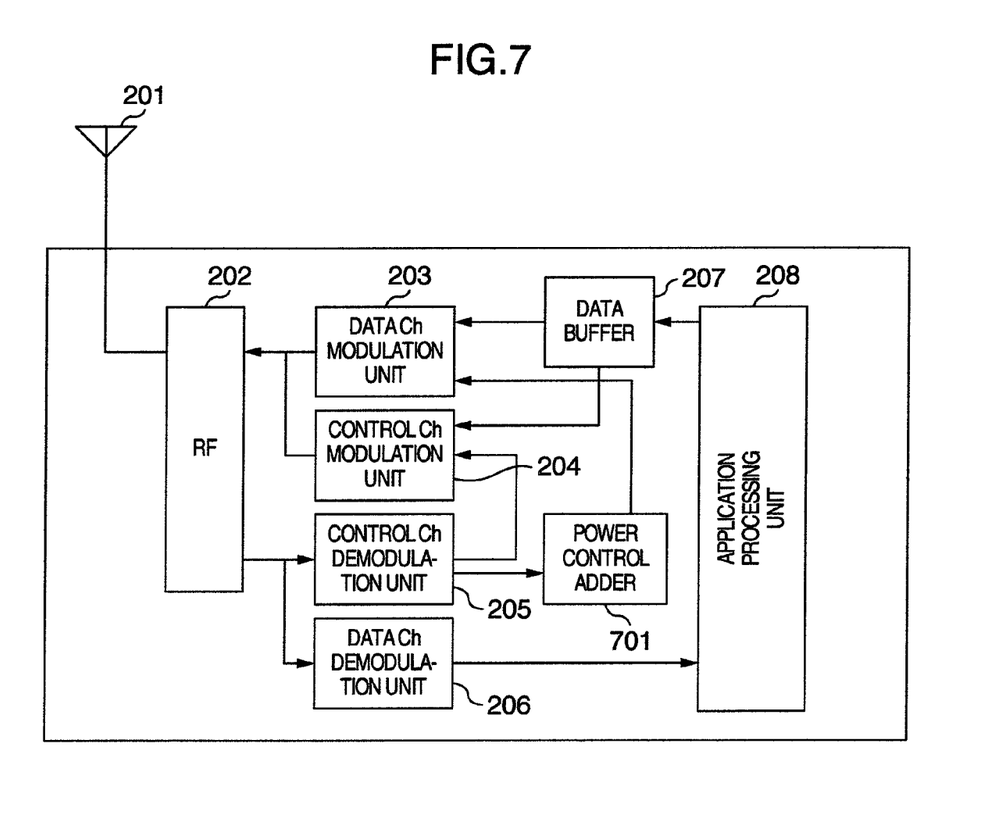
FIG. 7 is a diagram illustrating a configuration of a wireless access terminal in an embodiment of the present invention.

FIG. 7 is a diagram illustrating a configuration of a wireless access terminal in an embodiment of the present invention.

As shown in FIG. 7, the wireless access terminal comprises: the antenna 201 which transmits and receives a radio wave between a wireless base station to convert this into a high frequency signal; the RF unit 202 which modulates and demodulates the high frequency signal to convert into a baseband signal having a low frequency; the data Ch modulation unit 203 which modulates transmit data to convert into a baseband signal; the control Ch modulation unit 204 which modulates control information to convert into a baseband signal; the control Ch demodulation unit 205 which demodulates a received signal to extract control information; the data Ch receiving unit 206 which demodulates and decodes a received signal to extract received data; the data buffer 207 which temporarily buffers transmit data; and the application processing unit 208 which processes the application. The wireless access terminal further comprises a power-control adder 701, which retains a sum of all the power-control information correction values from a wireless base station, and controls the transmission power based on this. The wireless access terminal, when having handed off, includes a sum of power-control information correction values into a header of a transmission packet destined to a wireless base station and transmits this packet to the wireless base station to be handed off. After the handoff, the wireless access terminal includes this information into a header of a transmission packet and transmits this packet until it receives information indicative of "ready for packet reception" from the wireless base station to be handed off.

Figure 8:
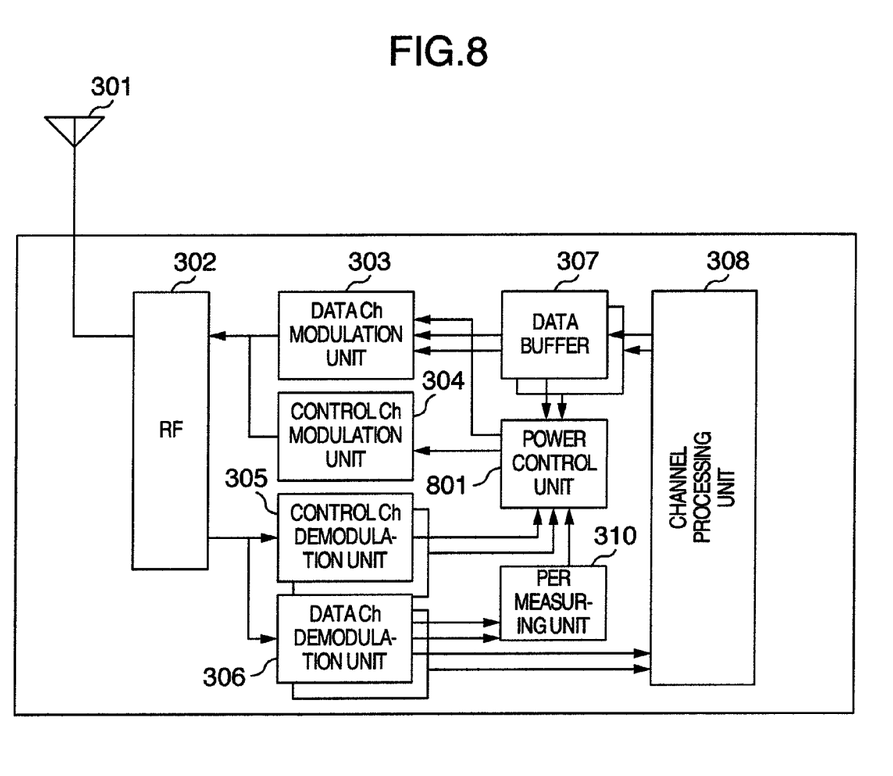
FIG. 8 is a diagram illustrating a configuration of a wireless base station in the embodiment of the present invention.

FIG. 8 is a diagram illustrating a configuration of a base station in the embodiment of the present invention.

As shown in FIG. 8, the wireless base station comprises: the antenna 301 which transmits and receives a radio wave between a wireless access terminal in an area to convert this into a high frequency signal, the RF unit 302 which modulates and demodulates the high frequency signal to convert into a baseband signal having a low frequency; the data Ch modulation unit 303 which modulates transmit data to convert into a baseband signal; the control Ch modulation unit 304 which modulates control information to convert into a baseband signal; the control Ch demodulation unit 305 which demodulates a received signal to extract control information; the data Ch receiving unit 306 which demodulates and decodes a received signal to extract received data; the data buffer 307 which temporarily buffers transmit data; the channel processing unit 308 for transmitting data to a wireless base station controller; the PER measuring unit 310 which calculates a packet error rate from a data demodulation result in the data Ch demodulation unit; and a power control unit 801 which determines a transmission power correction value of a wireless access terminal based on the information from the PER measuring unit and a sum of power-control information retained thereinside. Upon receipt of a sum of power-control information correction values from a wireless access terminal after handoff, the base station inputs this into the power control unit 801 to overwrite the sum of power-control information retained thereinside.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A wireless communication system, comprising:
a plurality of wireless base stations and a plurality of wireless access terminals, wherein each wireless base station of the plurality of wireless base stations including: a receiver for receiving wireless channel quality information which is sent from a plurality of wireless access terminals, respectively, a storage for storing the wireless channel quality information, and a calculator to calculate a transmission rate allocated to each of the plurality of wireless access terminals in accordance with the wireless channel quality information and channel quality information calculated in the wireless base station, and wherein the calculator allocates the calculated transmission rate;
wherein each wireless access terminal of the plurality of wireless access terminals including: a unit for measuring a wireless channel quality; a unit for reporting the measured wireless channel quality to a wireless base station; a unit for receiving transmission rate allocation information from the wireless base station; and a unit for transmitting a packet using the allocated transmission rate; and
wherein one of the plurality of wireless base stations receives a subject packet from a hand-off wireless access terminal which has handed off to one of the plurality of wireless base stations, the base stations searches a header of this subject packet to extract channel quality information sent from the hand-off wireless access terminal, the channel quality information being included in this subject header, sets an initial value of the allocated transmission rate for the hand-off wireless access terminal based on the extracted channel quality information, and thereafter performs calculation of an updated transmission rate for the hand-off wireless access terminal.

2. A wireless base station, comprising:
a receiver for receiving wireless channel quality information that is sent from a plurality of wireless access terminals, respectively;
a storage for storing the wireless channel quality information for each wireless access terminal;
a calculation unit for calculating a transmission rate allocated to each of the plurality of wireless access terminals in accordance with the wireless channel quality information and channel quality information calculated in the wireless base station;

an allocation unit for allocating the calculated transmission rate;

a search unit for searching a header of a packet;

an extraction means for extracting channel quality; and setting means for setting an initial value of the transmission rate; and wherein upon receipt of a subject packet from a wireless access terminal which has been handed off to the wireless base station, to be included in the plurality of wireless access terminals of the wireless base station:

the search unit searches a subject header of this subject packet, the extraction means extracts channel quality information from the wireless access terminal, the channel quality information being included in this subject header, the setting means sets an initial value of the transmission rate for the wireless access terminal, based on the extracted channel quality information, and thereafter, the calculation unit performs calculation of an updated transmission rate allocated to the wireless access terminal.

3. The wireless communication system according to claim 1, wherein:

said each wireless access terminal further comprising:

a packet error rate calculation unit which calculates a packet error rate based on information indicative of "ready or not ready for reception" from the wireless base station with respect to a packet transmitted to the wireless base station; and a unit which, after performing a handoff to switch a base station to connect to, inserts a packet error rate calculated in the wireless access terminal into a packet transmitted to the wireless base station until the unit receives information indicative of a success of packet reception from the wireless base station to switch to.

* * * * *